Patented Oct. 26, 1954

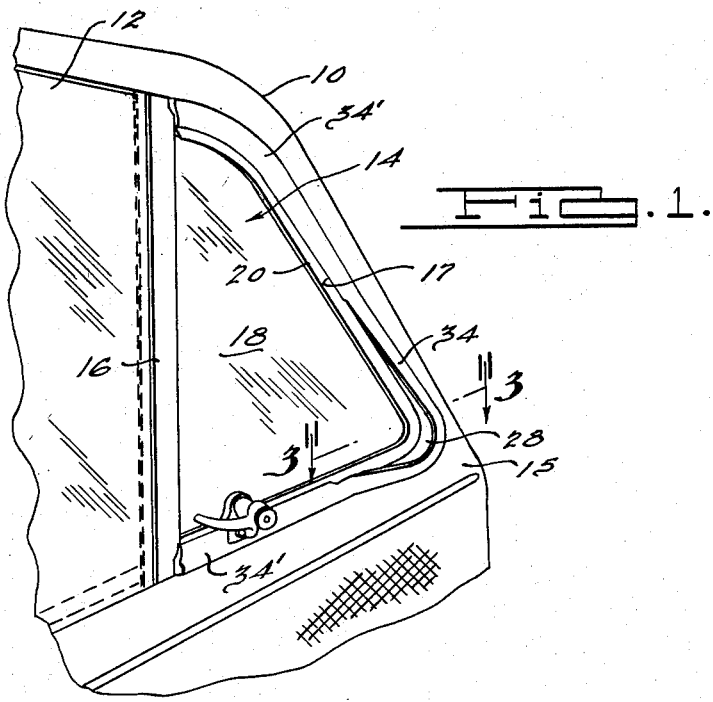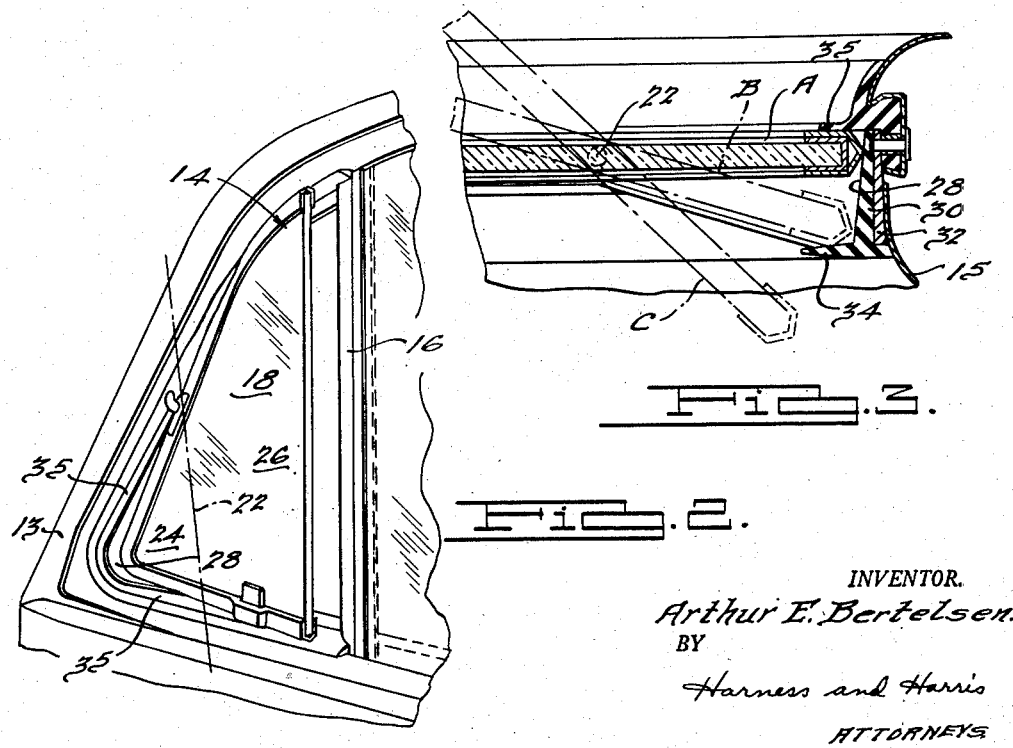

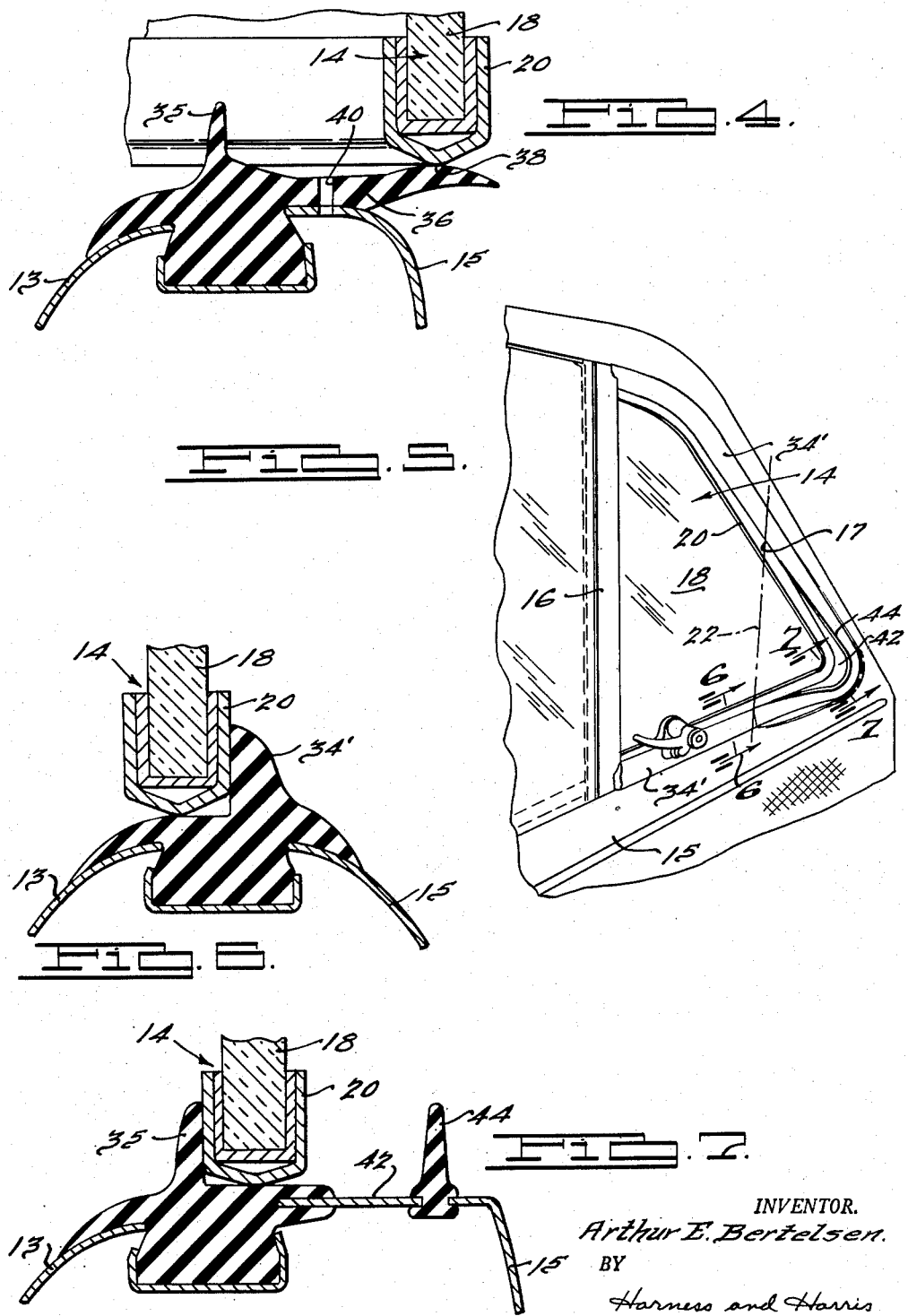

2,692,793

UNITED STATES PATENT OFFICE 2,692,793

SEAL FOR AUTOMOBILE VENTILATING WINDOWS

Arthur E. Bertelsen, Detroit, Mich., assignor to Chrysler Corporation, Highland Park, Mich., a corporation of Delaware Application May 27, 1952, Serial No. 290,296

11 Claims. (Cl. 296—44)

This invention relates to a sealing device for automobile ventilating windows and more particularly to a device which accommodates ventilation of the automobile, but prevents the admission of rain water.

Current automobile construction generally includes the use of a small ventilating window which is mounted in a window opening for pivotal movement about a substantially vertical axis for the ventilation of the vehicle and windows of this type are generally associated with a vertical sliding window. In rain storms when it is desirable to ventilate the vehicle it is found that rain water is driven downwardly on the outer face of the window and caused to drip inside the vehicle.

It is a principal object of this invention to provide a device of this type that has a seal to prevent the admission of rain water through the opening adjacent the forward portion of the ventilating window when the window is placed in at least one predetermined open position. Fresh air is thus withdrawn from the vehicle from the opening provided in the rear portion of the ventilating window.

It is a further object of this invention to completely seal the forward opening of the window in at least one of its operative positions and to provide a sealing lip that is sufficiently yieldable so that the window may override it without permanently deforming it when the window is opened to a material angular extent to accommodate the admission of fresh air.

It is an additional object of the invention to provide a ledge on the exterior of the forward portion of the window opening which is provided with spaced flexible lips on its inner and outer marginal edges with one of said lips sealing the forward portion of the ventilating window when the window is in its closed position and the ledge and the other lip cooperating to seal the forward portion of the window opening when the window is in a predetermined open position.

In the drawings:

Fig. 1 is a fragmentary perspective view showing a portion of the inside of an automobile door equipped with a ventilating window and one form of my invention;

Fig. 2 is a fragmentary perspective view showing a portion of the outside of an automobile door equipped with ventilating window and the Fig. 1 form of my invention;

Fig. 3 is an enlarged fragmentary horizontal sectional view taken on the line 3—3 of Fig 1;

Fig. 4 is an enlarged vertical section showing a modification of my invention;

Fig. 5 is a fragmentary perspective view showing a portion of the inside of an automobile door equipped with a ventilating window and another form of my invention;

Fig. 6 is an enlarged fragmentary vertical sectional view taken on the line 6—6 of Fig. 5; and Fig. 7 is an enlarged fragmentary vertical sectional view taken on the line 7—7 of Fig. 5.

In Fig. 1 the interior of the forward upper portion of an automobile vehicle door 10 is illustrated as provided with a conventional vertical sliding window 12 and a conventional "no draft" ventilating window 14. The vehicle door 10 includes an interior trim molding 15 which defines a window opening large enough to receive both the windows 12 and 14. These windows are separated by a guide strip 16 which provides one channel for the sliding window 12 and provides a seal for the rear edge of the "no draft" ventilating window 14. The strip 16 cooperates with the molding 15 and an outside door panel 13 to define a small window opening 17 for the ventilating window 14. It is to be understood that the window 14 could be mounted in any body panel and that a door has been selected merely as a typical installation.

The window 14 comprises a pane of glass 18 and a metal frame 20. The metal frame 20 is pivotally mounted in the window opening 17 for rotation about a substantially vertical axis 22 in a conventional manner. It is well known that when the window 14 is opened by rotation on the axis 22 that that portion of the window 24 which is located forwardly of the axis 22 moves inwardly of the vehicle while the portion 26 which is located rearwardly of the axis 22 moves outwardly of the vehicle thereby providing an opening between the glass 18 and the strip 16 through which air is evacuated during forward motion of the vehicle.

In the form of the invention shown in Figs. 1 through 3 I provide a sealing device that permits the window to be opened to a predetermined position as illustrated in Fig. 2. When in this position air may be evacuated from the vehicle in the space between the glass 18 and the strip 16, but air and water are prevented from entering the vehicle forwardly of the axis 22. To accomplish this I have provided an inwardly extending ledge 28 which, in this form of the invention, is illustrated as comprising a rubber covering 30 which is supported by a metal plate 32. The rubber covering 30 has its inner marginal edge provided with a flexible protuberance in the form of a lip 34 against which the forward portion of the ventilating window 14 is adapted to abut when the window is in the predetermined open position designated by the latter B in Fig. 3. The ridge 28 and its associated lip 34 preferably extend around the periphery of the window opening 17 between limits defined by the pivotal mountings of the window 14 and the depth of the ledge decreases in the vicinity of the pivotal mountings so that it may be said that the lip 34 is located in a plane that contains the axis 22 whereby an abutting relationship with the arcuately moving forward portion of the window 14 is assured. Lips 34' which are illustrated in Fig. 1 as extensions of the lip 34 extend rearwardly of the pivotal axis 22 in the plane of the window opening 17 and seal the inside of the rear portion of the ventilating window when it is in its closed position. Lips 34' correspond to lips which are provided on many conventional automobiles for this purpose. Similarly protuberance in the form of a conventional lip 35 is provided on the external side of the window opening forwardly of axis 22 to seal the ventilating window when it is in its closed position.

The lip 34 is preferably formed of a rubber-like material which is sufficiently yieldable to permit the window 14 to override it without permanent deformation so that the window may be opened to a material angular extent when it is not raining and a large amount of ventilation is desired. In Fig. 3 the broken line representation of the window designated by the letter C illustrates the window in this open position. In this same figure the window, in its closed position, is illustrated in solid lines and designated by the letter A.

In Figure 4 a modified form of the invention is illustrated. This form of the invention corresponds generally to the form illustrated in Figures 1 through 3 except that the ledge 36 therein which corresponds to ledge 28 in Fig. 2 is formed entirely of rubber-like material and has a convex raised portion 38 which forms a window engaging protuberance. The portion 38 is substituted for the lip 34 of the Fig 1 through 3 form of the invention and engages the bottom of the window frame 20 to provide a seal when the ventilating window is in its predetermined open position. In addition, a drain 40 which it is to be understood may be associated with any of the forms of the invention described herein is illustrated. The drain 40 permits water which accumulates on the ledge to be drained off through the inside of the door. The external lip 35 of the Figure 1 through 3 form of the invention is formed as an integral part of the ledge 36 in this modified device. The protuberance 38 is flexible enough to permit the window to override it without permanently deforming it when the admission of air is desired.

In Figures 5 through 7 a modified form of the invention is illustrated. In this form of the invention a ledge 42 is formed as an integral part of the interior trim molding 15 and a lip 44, corresponding to the lip 34 of Fig. 2, is mounted as a separate insert in the moulding 15. The lip 44 is illustrated as an integral portion of the conventional lips 34' with the lip 44 being located forwardly of the axis 22 on the interior of the door. The general shape of the ledge 42 and lip 44 correspond to that which was described in connection with the Fig. 1 through 3 form of the invention and deformation of the lip 44 is intended when the ventilating window 14 is opened to a material angular extent. The numerals used in Figures 1 through 3 to designate similar components are repeated in Figures 5 through 7.

I claim:

1. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel and extending inwardly around the periphery of said window opening on the forward side of said axis between limits defined by said pivots, said ledge having an inner edge portion located in a plane containing said axis, first and second window engaging protuberances carried by said ledge throughout its length, one of said protuberances being positioned to abut the forward portion of said window to provide a seal on the exterior thereof when said window is in its closed position and the other of said protuberances protruding from the inner edge portion of said ledge and engaging the forward portion of said window in sealing relationship when said window is in a predetermined open position.

2. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel and extending inwardly around the periphery of said window opening on the forward side of said axis between limits defined by said pivots, said ledge having an inner edge portion located in a plane containing said axis, first and second window engaging protuberances carried by said ledge throughout its length, said first protuberance being positioned so that the forward portion of said window abuts said first protuberance to provide a seal on the exterior thereof when said window is in its closed position with the forward portion of said window spaced from the inner edge portion of said ledge, said second protuberance being carried by the inner edge portion of said ledge and abutting the forward portion of said window in sealing relationship when said window is in a predetermined open position.

3. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel and extending around the periphery of said window opening on the forward side of said axis between limits defined by said pivots and a window engaging protuberance carried by said ledge throughout its length and being mounted on said ledge along a line defined by a plane containing said axis, said protuberance being positioned to engage the forward portion of said window in sealing relationship when said window is in a predetermined open position.

4. An automobile body panel having a window opening and a window pivotally mounted in said opening on a pair of vertically spaced pivots defining a substantially vertically extending axis located between the forward and near portions of said window, said window being mounted for rotation from a closed position in the plane of said window opening to open positions in which the forward portion of said window extends inwardly of the plane of said window opening and the rear portion of said window extends outwardly of the plane of said window opening, the forward edge of said window defining an arcuate path as the window is rotated about its axis, and a sealing device for the window opening on the forward side of said axis, said sealing device including a ledge carried by said panel and extending around the periphery of said window opening on the forward side of said axis, said ledge being positioned substantially in said arcuate path and having an inner edge defined by a plane containing said axis, a first window engaging protuberance carried by said ledge throughout its length substantially in the plane of said window opening, and a second window engaging protuberance carried by the inner edge of said ledge, said first protuberance providing an exterior seal for the forward portion of said window when the window is closed and said second protuberance cooperating with said ledge to provide an interior seal for the forward portion of said window when the window is in a predetermined open position.

5. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel and extending around the periphery of said window opening on the forward side of said axis between limits defined by said pivots and a window engaging protuberance carried by said ledge throughout its length and being mounted on said ledge along a line defined by a plane containing said axis, said protuberance being positioned to engage the forward portion of said window in sealing relationship when said window is in a predetermined open position and said ledge being provided with a drainage passage through which water accumulating on said ledge may escape.

6. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel and extending around the periphery of said window opening on the forward side of said axis between limits defined by said pivots and a window engaging protuberance carried by said ledge throughout its length and being mounted on said ledge along a line defined by a plane containing said axis, said protuberance being positioned to engage the forward portion of said window in sealing relationship when said window is in a predetermined open position and said protuberance being sufficiently yieldable to permit the forward portion of said window to override it when said window is opened to a material angular extent without effecting a permanent deformation of said protuberance.

7. In an automobile body panel having a window opening and a window pivotally mounted therein on a pair of vertically spaced pivots defining a substantially vertically extending axis located between the front and rear portions of said window, said window being mounted for rotation from a closed position in the plane of said panel to open positions in which a first portion of said window on a first side of said axis extends inwardly of the plane of said panel and that portion of said window on the other side of said axis extends outwardly of the plane of said panel, the combination with said panel and window of a ledge carried by said door on said first side of said axis and extending around the periphery of said window opening on the first side of said axis from one of said pivots to the other and extending inwardly of said panel and substantially normal to the plane of said window opening, said ledge having an inner edge in a plane defined by said window when the window is in a predetermined open position.

8. In an automobile body panel having a window opening and a window pivotally mounted therein on a pair of vertically spaced pivots defining a substantially vertically extending axis located between the front and rear portions of said window, said window being mounted for rotation from a closed position in the plane of said panel to open positions in which a first portion of said window on a first side of said axis extends inwardly of the plane of said panel and that portion of said window on the other side of said axis extends outwardly of the plane of said panel, the combination with said panel and window of a ledge and flexible lip, said ledge being carried by said door on said first side of said axis and extending around the periphery of said window opening on the first side of said axis from one of said pivots to the other and extending inwardly of said panel and substantially normal to the plane of said window opening and said flexible lip projecting from said ledge in a plane defined by said window when the latter is in a predetermined open position whereby said ledge and said lip cooperate to seal the portion of said window opening on the first side of said axis against the admission of air or liquid when the window is in said predetermined open position.

9. A window mounted in a window opening for pivotal movement on a pair of spaced pivots defining an axis extending through a midportion of said window, said window being mounted for rotation from a closed position in the plane of said window opening to open positions in which a first portion of said window on a first side of said axis extends inwardly of the plane of said window opening and that portion of said window on the other side of said axis extends outwardly of the plane of said window opening, and a sealing device extending around the periphery of said window opening on said first side of said axis from one of said pivots to the other, said sealing device including a ledge and a pair of sealing lips carried by said ledge one at either side of said window, the window, when in a predetermined open position, engaging one of said lips throughout the entire length of said window on the first side of said axis and engaging the other lip when in its closed position.

10. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window extends outwardly of the plane of said window opening, and a sealing device for the window opening on the forward side of said axis, said sealing device including a ledge carried by said panel in the region of the forward portion of said window and extending around the periphery of said window opening from one of said pivots to the other and a window engaging protuberance carried by said legde, said protuberance being located in a plane defined by the forward portion of said window when said window is in a predetermined open position and said protuberance being sufficiently yieldable to permit the forward portion of said window to override it when said window is opened to a material angular extent without effecting a permanent deformation of said protuberance.

11. An automobile body panel having a window opening and a window pivotally mounted in said opening on a pair of vertically spaced pivots defining a substantially vertically extending axis located between the forward and rear portions of said window, said window being mounted for rotation from a closed position in the plane of said window opening to open positions in which the forward portion of said window extends inwardly of the plane of said window opening and the rear portion of said window on the other side of said axis extends outwardly of the plane of said window opening, and a sealing device for the window opening on the forward side of said axis, said sealing device including a rubber-like ledge carried by said panel and extending around the periphery of said window opening on the forward side fo said axis between limits defined by said pivots, said ledge terminating on its inner margin in a flexible window engaging protuberance in a plane defined by said window in one of its open positions, said protuberance thus being positioned to engage the forward portion of said window in sealing relationship when said window is in said predetermined open position.

References Cited in the file of this patent

UNITED STATES PATENTS

| Number | Name | Date |
| --- | --- | --- |
| 1,998,126 | Fisher | Apr. 16, 1935 |
| 2,390,260 | King | Dec. 4, 1945 |
| 2,507,287 | Werner | May 9, 1950 |